US006847020B2

(12) United States Patent
Yang et al.

(10) Patent No.: US 6,847,020 B2
(45) **Date of Patent: *Jan. 25, 2005**

(54) TRAY ASSEMBLY FOR A MICROWAVE OVEN INCORPORATING TOASTER

(75) Inventors: Ho Gab Yang, Changwon-si (KR); Gyu Sik Cho, Changwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/603,932

(22) Filed: Jun. 26, 2003

(65) Prior Publication Data

US 2004/0000546 A1 Jan. 1, 2004

(30) Foreign Application Priority Data

Jun. 28, 2002 (KR) ................................ 10-2002-0037148
Jun. 28, 2002 (KR) ................................ 10-2002-0037146
Jun. 29, 2002 (KR) ................................ 10-2002-0037624

(51) Int. Cl.$^7$ ............................ H05B 6/80; A47J 37/00

(52) U.S. Cl. ....................... 219/685; 219/680; 219/756; 219/762; 219/521; 99/392; 99/DIG. 14

(58) Field of Search ................................ 219/685, 680, 219/725, 739, 756, 762, 763, 386, 521; 99/385, 391, 392, 393, 399, 400, 402, 451, DIG. 14

(56) References Cited

U.S. PATENT DOCUMENTS 4,346,651 A 8/1982 Schickedanz
6,104,001 A 8/2000 Huggler
6,539,840 B2 4/2003 Choi et al.
6,610,970 B1 * 8/2003 Back .......................... 219/685

FOREIGN PATENT DOCUMENTS

EP 1 213 948 A2 6/2001

* cited by examiner

*Primary Examiner*—Philip H. Leung
(74) *Attorney, Agent, or Firm*—McKenna Long & Aldridge LLP

(57) ABSTRACT

A microwave oven incorporating a toaster includes a toaster door provided on a toaster panel for opening and closing at least one toaster entrance and a tray assembly. The tray assembly includes a tray support inside the toaster and at least one tray which is fastened to a top of the tray support for holding a food item. The tray includes at least one elevating bracket for maintaining a predetermined distance between the tray and the tray support. In addition, the tray assembly further includes a support wall provided at a front end of the tray for supporting a front lower portion of the food item so as to stably position the food item at an optimal location for toasting. In the microwave oven incorporating a toaster, each food item is positioned against a heater included therein so as to maximize the toasting performance of the toaster. Also the tray support can be easily disassembled and assembled for the purpose of cleaning and replacing with a new tray.

24 Claims, 4 Drawing Sheets

TRAY ASSEMBLY FOR A MICROWAVE OVEN INCORPORATING TOASTER

CROSS-REFERENCE TO RELATED APPLICATIONS

This application claims the benefit of Korean Application No. P2002-0037146, filed on Jun. 28, 2002, Korean Application No. P2002-0037148, filed on Jun. 28, 2002, and Korean Application No. P2002-0037624, filed on Jun. 29, 2002, which are hereby incorporated by reference as if fully set forth herein.

BACKGROUND OF THE INVENTION

1. Field of the Invention

The present invention relates to a microwave oven, and more particularly, to a tray assembly for a microwave oven incorporating a toaster.

2. Discussion of the Related Art

In general, a conventional microwave oven, which is illustrated in FIG. 1, heats objects (e.g., slice of bread or bagel, etc.) by applying microwaves to them. Referring to FIG. 1, the microwave oven includes a cavity 2, in which an object may be heated by microwaves. The cavity 2 is provided in an interior of a cavity assembly 1 and may be opened and closed via a cavity door 4. Microwaves may be generated by various electrical devices accommodated with an electrical device chamber 10 provided near the cavity 2. The electrical device chamber 10 may be covered with an outer case 6. The various electrical devices may include, for example, a magnetron 12 for generating microwaves, a high-voltage transformer 14 for supplying high voltages to the magnetron 12, and a fan 16 for generating an air flow inside of the cavity 2 thereby cooling the various electrical devices as they may become heated.

While the conventional microwave oven heats objects using microwaves, microwaves cannot be used to toast food (e.g., slice of bread or bagel, etc.). Therefore, microwaves ovens capable of toasting food as well as heating an object using microwaves have become desirable. In such microwave ovens including a toaster, crumbs of bread are generated as a slice of bread is heated within the toaster. For this reason, a tray assembly including a tray on which a food item is placed and a tray support supporting such tray must be designed such that the tray and tray support can be easily assembled and/or disassembled for the purpose of cleaning and maintaining the toaster. Also, each food item must be positioned at an optimal location within the toaster such that the toasting performance is maximized.

SUMMARY OF THE INVENTION

Accordingly, the present invention is directed to a microwave oven incorporating a toaster that substantially obviates one or more problems due to limitations and disadvantages of the related art.

An object of the present invention is to provide a microwave oven incorporating a toaster, wherein food items may be positioned at an optimal location within the toaster such that the toasting performance of the toaster can be maximized.

Another object of the present invention is to a microwave oven incorporating a toaster, wherein a tray holding a food item and a tray support supporting the tray can be easily assembled and disassembled for the purpose of eliminating crumbs of bread, which are often generated as a slice of bread is toasted, from the toaster.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a microwave oven incorporating a toaster includes, for example, a toaster door and a tray assembly. The toaster door may be arranged on a toaster panel for opening and closing at least one toaster entrance. The toaster panel may, for example, be provided on a front side of the toaster.

The toaster assembly may, for example, include a microwave cavity, a toaster arranged adjacent to the microwave cavity, and a tray support provided inside the toaster. At least one tray may be provided on top of the tray support for holding a food item, and it may, for example, include at least one elevating bracket for maintaining a predetermined distance between the tray and the tray support. Additionally, a support wall may be provided at a front end of the tray for supporting a front lower portion of the food item so as to stably position the food item at an optimal location for toasting. The elevating bracket may, for example, include at least one fastening hook extending downward and along a first direction parallel to the tray, and at least one extension extending downward. On the other hand, the elevating bracket may, for example, include a first plurality of fastening slits for accommodating the at least one fastening hook, and a second plurality of fastening slits for accommodating the at least one extension.

For example, the tray may be securely arranged on top of the tray support upon initially inserting the plurality of fastening hooks of the tray into the corresponding first plurality of fastening slits, moving the tray in the direction the ends of the fastening hooks are extended toward, and inserting the at least on extension into the second plurality of fastening slits. As the at least one extension is inserted into the corresponding second plurality of fastening slits, a detent provided on the extension may engage with a corresponding aperture provided on the tray support for slip fit engagement. Additionally, the tray may include a rear flange provided at a rear end of the tray for supporting a backside of the food item on the tray.

According to the principals of the present invention, the microwave oven incorporating a toaster further includes a heater for generating heat necessary to toast food items (e.g., slices of bread or bagels, etc.) and at least one connecting link arranged between the toaster door and the tray assembly for moving the tray assembly when the toaster is opened or closed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
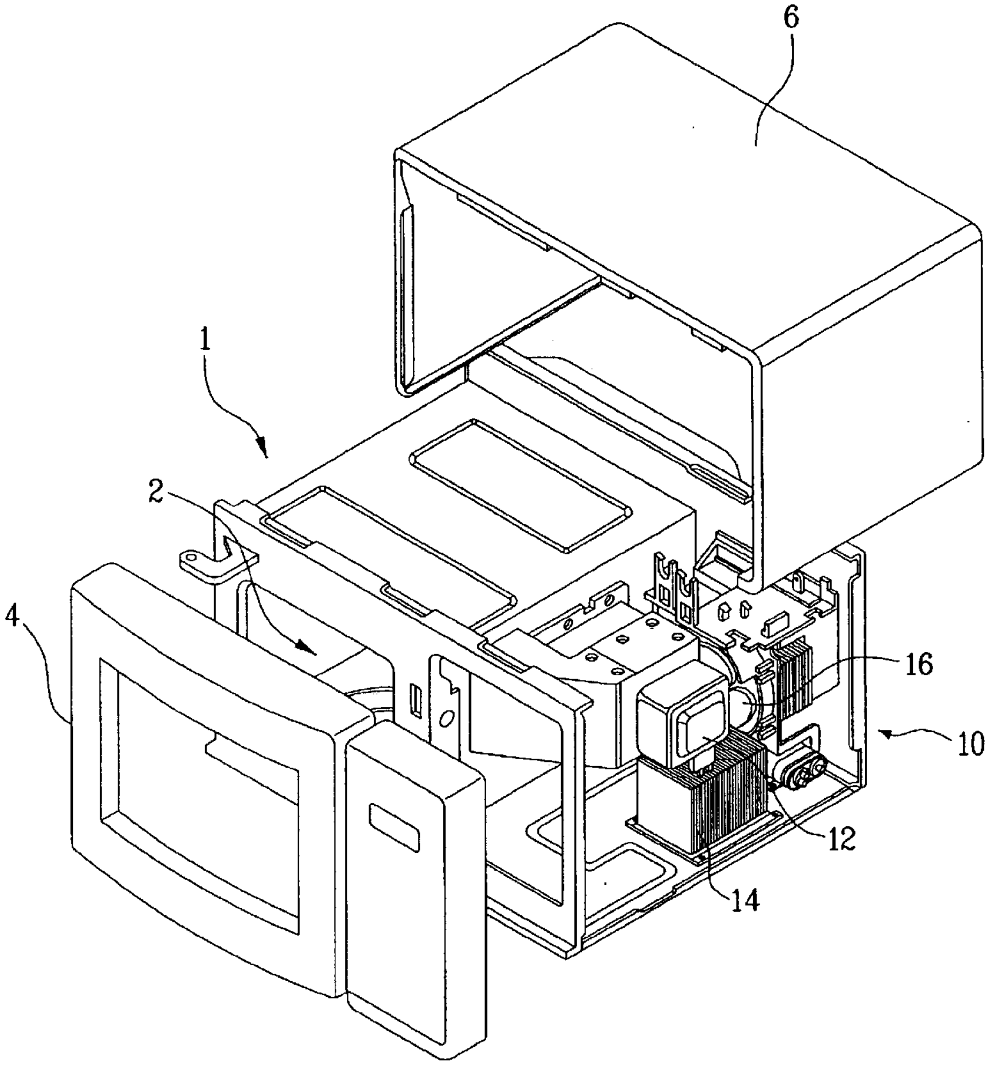
FIG. 1 Related Art
FIG. 1 illustrates an exploded perspective view of a related art microwave oven.
Figure 2:
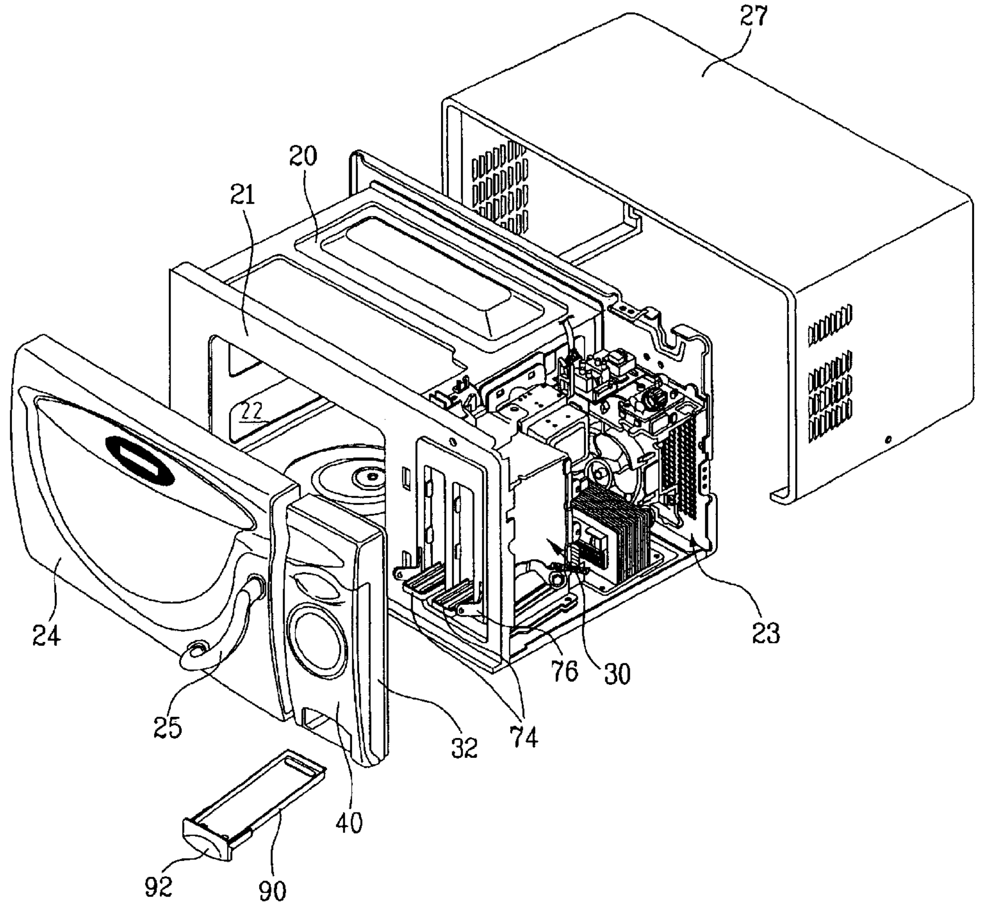
FIG. 2 illustrates an exploded perspective view of a microwave oven incorporating a toaster in accordance with the present invention.

FIG. 2 illustrates an exploded perspective view of a microwave oven incorporating a toaster in accordance with the principals of the present invention. Referring to FIG. 2, a cavity 22 is arranged within a cavity assembly 20 and an electrical device chamber 23 is arranged adjacent to the cavity 22. An object (e.g., food) arranged within the cavity 22 may be heated by microwaves generated by various electrical devices arranged within the electrical device chamber 23.

The cavity 22 may be opened and closed via a cavity door 24. The cavity 22 may be closed when the cavity door 24 contacts a front plate 21. A user may open and close the cavity door 24 using a door handle 25 provided within the cavity door 24.

An outer case 27 may cover the cavity assembly 20 and the electrical device chamber 23, thereby forming top and side exterior surfaces of the microwave oven. A toaster 30 may be arranged in front of the electrical devices within the electrical device chamber 23. The toaster 30 may be installed in such a way that it penetrates the front plate 21. A toaster panel 32 comprising an exterior surface material may be provided in front of the toaster 30. In one aspect of the present invention, the exterior surface material of the toaster panel 32 may be the same as that of the cavity door 24, such that a smooth surface may be formed on the front surface of the microwave oven between the toaster panel 32 and the cavity door 24.

Figure 3:
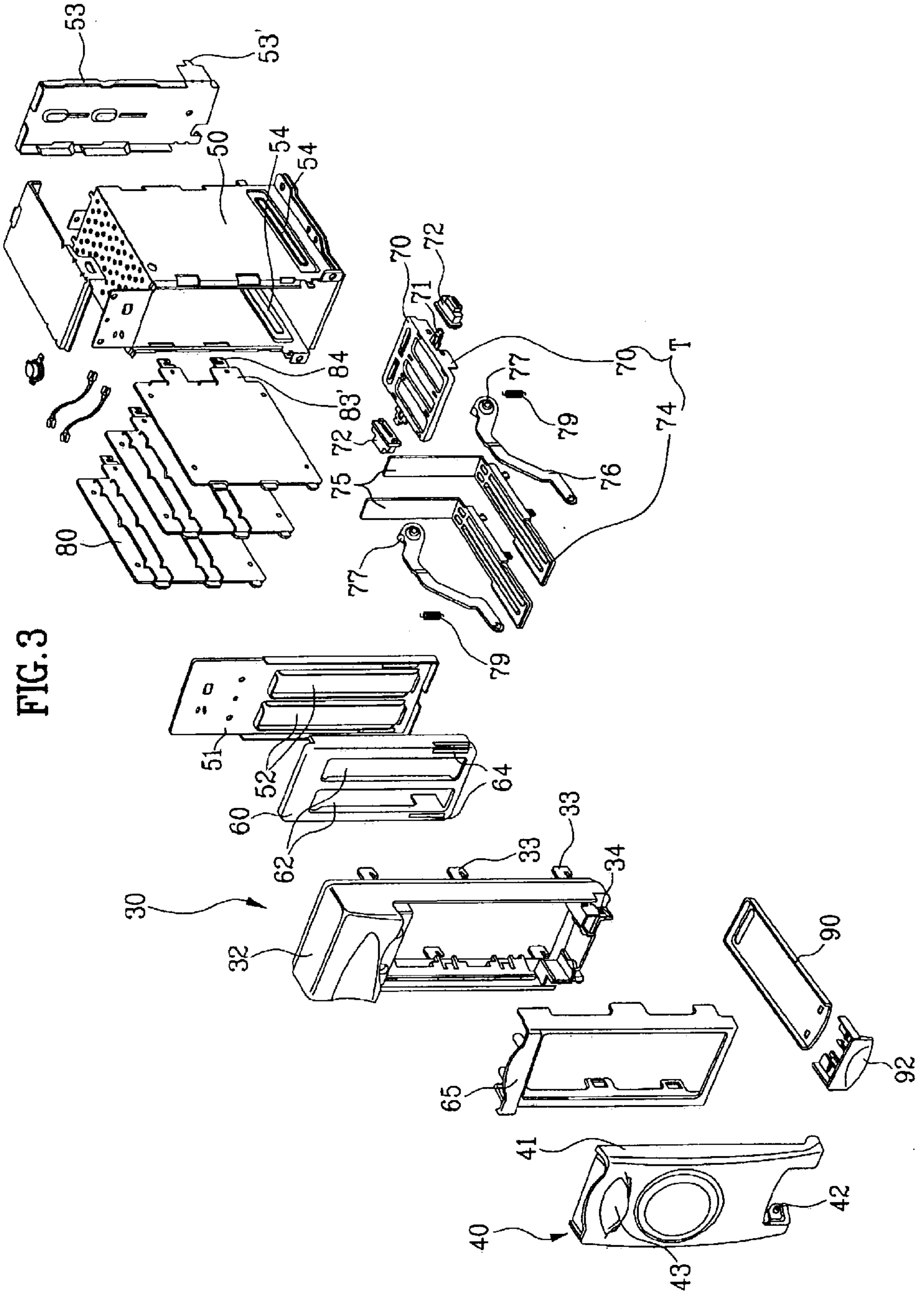
FIG. 3 illustrates an exploded perspective view of the toaster shown in FIG. 2.

FIG. 3 illustrates an exploded perspective view of the toaster 30 shown in FIG. 2. Referring to FIG. 3, the rear of the toaster panel 32 may be provided with a plurality of fixing means 33 (e.g., hooks, screws, adhesive, and the like) such that the toaster panel 32 may be fixed to the front plate 21 (shown in FIG. 2) by the fixing means 33.

The toaster 30 further includes a toaster door 40 attached to the toaster panel 32 by a hinge assembly. To this end, the hinge assembly includes hinge holes 34, included within the toaster panel 32, and hinge pins 42, included within a bottom portion of the toaster door 40. Accordingly, the toaster door 40 may be opened or closed by rotating about an axis formed by the hinge pins 42 and binge holes 34. In one aspect of the present invention, the exterior surface material of the door panel 41 may be the same as that of the toaster panel 32, such that a smooth surface may be formed on the front surface of the microwave oven between the door panel 41, the cavity door 24 and the toaster panel 32. The hinge pins 42 may be provided that the bottom of the door panel 41 in such a way that the toaster door 40 may be rotated into an opened and closed position. The door panel 41 further includes a toaster door handle 43 allowing a user to open and close the toaster door 40.

Referring to FIG. 3, the toaster 30 further includes a toaster case 50 arranged at the back portion of the toaster panel 32. The toaster case 50 may be coupled to the toaster panel 32 through a portion of the font plate 21 corresponding to the front side of the electrical device chamber 23. In one aspect of the present invention, the toaster case 50 may be made of a metal material, provide a space for toasting each food item, and include a case front plate 51.

The case front plate 51 provided at the front of the toaster case 50 includes two case entrances 52 through which food items may pass upon their insertion into and removal from the interior of the toaster case 50. Two spring hooks 53' may be provided at the bottom of a rear case plate 53 provided at the back of the toaster case 50. Each of the spring hooks 53' may be connected to one end of a spring 79 for purposes that will be discussed in greater detail below.

A pair of moving slots 54 may be arranged within the sidewalls of the toaster case 50 and oriented along a direction parallel to the bottom edge of the toaster case sidewalls. Further, each moving slot 74 may guide a bushing 72 provided therein, as will be discussed in greater detail below.

A toaster front 60 made of metal material may be arranged at the front of the case front plate 51 and within the toaster panel 32. The toaster front 60 includes two rectangular toaster entrances 62 that may be selectively exposed or concealed when the toaster door 40 opened or closed, respectively. Each of the toaster entrances 62 may be coupled to respective ones of the case entrances 52. Two lever slots 64 may be provided at a bottom portion of the toaster front 60, such that a connecting lever 76 may move through a corresponding one of a lever slot 64.

The toaster 30 further includes a plurality of heaters 80 formed within the toaster case 50. The heaters 80 are capable of generating heat sufficient to toast a food item (e.g., slice of bread or bagel, etc.). Each of the heaters 80 comprises a plurality of heating elements (e.g., heat-generating wires wound about a support plate, not shown). The heaters 80 may be positioned at portions corresponding to sides of food items and provide heat to the both sides of the food items arranged within the toaster 30.

An insulation plate 65 may be arranged between the toaster front 60 and the toaster panel 32. Accordingly, the insulation plate 65 may be made of an insulating material suitable for blocking heat generated within the toaster 30 from flowing from the toaster front 60 to the toaster panel 32.

A crumb holder 90 may be arranged at the bottom of the toaster case 50 through the lower part of the toaster panel 32. The front of the crumb holder 90 comprises a holder handle 92 provided between the hinge pins 42. In practice, a user may pull the holder handle 92 to back draw out the crumb holder 90, empty the crumb holder 90, and push the holder handle 92 back thereby placing the crumb holder 90 at the bottom of the toaster case 50. In one aspect of the present invention, the holder handle 92 may include a front surface that is the same as that of the toaster panel 41.

A tray assembly, T, arranged within the interior of the toaster case 50 will now be described detail. The tray assembly T, supports at least one food item. As shown in FIG. 3, the tray assembly T includes a tray support 70 and two trays 74 securely arranged on top of the tray support 70. In one aspect of the present invention, the tray 74 may support a food item vertically thereon (i.e., an orientation wherein a major surface of the good item arranged vertically over the tray 74). Upon opening or closing the toaster door 40, the tray assembly T enables food items to be inserted into or removed from the interior of the toaster case 50.

Figure 4:
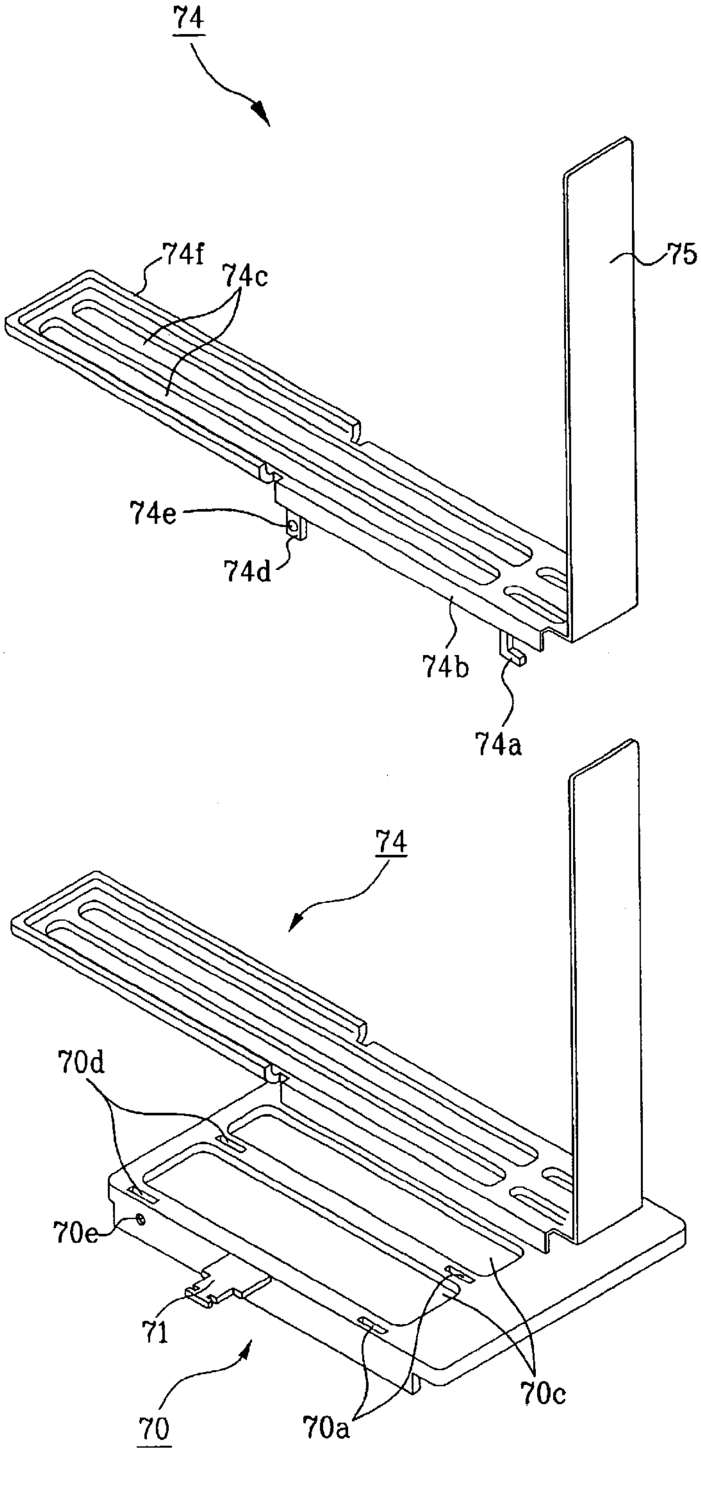
FIG. 4 illustrates a perspective view of the tray assembly included within the toaster shown in FIG. 3.

FIG. 4 illustrates perspective views of the tray 74 and the tray assembly T included within the toaster 30 shown in FIG. 3. Referring to FIG. 4, the tray 74 comprises a plurality of fastening hooks 74*a* formed on the lower rear portions of a pair of elevating brackets 74*b*, and a plurality of ventilation slits 74*c* for heat and air circulation. The elevating brackets 74*b* may be arranged between the tray 74 and the tray support 70 such that the elevating bracket 74*b* maintains a predetermined distance between the tray 74 and the tray support 70. The plurality of fastening hooks 74*a* may be formed so as to extend downward from the elevating brackets 74*b* and along a first direction, toward a rear end of the tray 74. Alternatively, the fastening hooks 74*a* may be formed so as to extend downward and along a second direction toward a front end of the tray 74.

The tray 74 further comprises a plurality of extensions 74*d* formed on the lower front portions of the elevating brackets 74*b*, respectively, and a detent (e.g., extrusion) 74*e* formed on one side of at least one of the plurality of extensions 74*d*. The plurality of extensions 74*d* may be formed so as to extend downward from the elevating brackets 74*b*.

Additionally, a rear flange 75 may be provided at the rear end of the tray 70 for supporting the backside of a food item. Accordingly, the food item may be stably positioned and supported on the tray 74 by the rear flange 75 when the toaster door 40 is opened or closed. Also, the rear flange 75 can be additionally used for the purpose of safety. For example, the height and width of the rear flange may be selected to correspond to those of the corresponding toaster entrance 62 so as to block the toaster entrance 62 when the toaster door 40 is fully opened. This structure will prevent a child or a user from inserting his or her finger or any other flammable object into the inside space of the toaster 30 when the toaster door is fully opened.

Furthermore, a support wall 74*f* having a predetermined height may be provided at the front end of the tray 74 for stably supporting and positioning the front lower portion of the food item at an optimal location for toasting. The support wall 74*f* may comprise a first wall extended upward from the frontal edge of the tray 74, a second wall extended upward from a predetermined portion of the left edge of the tray 74, and a third wall extended upward from a predetermined portion of the right edge of the tray 74. The first wall supports the front lower side of the food item, and the second and third walls support both sides of the front lower portion of the food item. The structure of the support wall 74*f* prevents the food item from leaning, enabling the food item to be positioned within the toaster 40 at an optimal location for toasting. The tray 74 including the support wall 74*f* may be made of a metal material and be formed as a single body, wherein the support wall 74*f* may be formed by bending the frontal edge of the tray 74 upward and the second and third walls may be formed by bending predetermined portions of the left and right edges of the tray 74 upward.

Referring back to FIG. 4, a first plurality of fastening slits 70*a* and a second plurality of fastening slits 70*d* may be arranged within a flat area of the tray support 70, and a plurality of air-openings 70*c* may be provided within the flat area for allowing heat and air circulation. Additionally, an aperture 70*e* is provided on each sidewall of the tray support 70 for slip fit engagement with the tray 74.

The first plurality of fastening slits 70*a* and the second plurality of fastening slits 70*d* accommodate the plurality of fastening hooks 74*a* and the plurality of extensions 74*d*, respectively, such that the tray 74 may be securely arranged on the tray support 70. For example, the tray 74 may be securely arranged on the tray support 70 upon initially inserting the plurality of fastening hooks 74*a* of the tray 74 into the corresponding first plurality of fastening slits 70*a*, moving the tray 74 in the direction the ends of the fastening hooks 74*a* are extended toward, and inserting the plurality of extensions 74*d* into the second plurality of fastening slits 70*d* for slip fit engagement with the tray support 70. As the plurality of extensions 74*d* are inserted into the second plurality of fastening slits 70*d*, the detent 74*e* provided on at least one of the extensions 74*d* engages with the aperture 70*e* to prevent the tray 74 from being easily disengaged from the tray support 74.

On the other hand, the tray 74 may be easily disassembled (detached) from the tray support 70 upon initially detaching the plurality of extensions 74*d* from the second plurality of fastening slits 70*d* by pulling the front portion of the tray 74 upward, moving the tray 74 in a direction opposite to the direction the ends of the fastening hooks 74*a* are extended toward, and detaching the plurality of fastening hooks 74*a* from the corresponding first plurality of fastening slits 70*a*. Since the tray 74 and the tray support 70 can be easily assembled and disassembled as described above, a user is able to easily detach the tray 74 from the toaster 30 for the purpose of cleaning or replacing with a new tray.

In addition, due to design constraints induced by the configuration of the heating plate 80 (shown in FIG. 3), it is difficult to arrange heating elements (e.g., heat-generating wires) at lower portions of each heating plate 80. By securely arranging the tray 74 on the tray support 70, however, a bottom portion on both sides of each food item may be vertically aligned proximate respective heating elements arranged on each heating plate 80 to allow an entirety of each side of each food item to be uniformly heated.

Referring back to FIG. 3, the tray support 70 includes two connecting parts 71 provided on left and right sides of the tray support 70. Bushing 72 may be provided at ends of each connecting parts 71 and be inserted into a respective one of a moving slot 54. Each bushing 72 supports the tray support 70 and has a shape allowing it to move within the moving slot 54 while preventing the tray support 70 from rotating while the bushing 72 is moving. By preventing the tray support 70 from rotating, the trays 74 may always be kept parallel to the orientation of the moving slots 54. The width of the tray support 70 and the frontal width of the toaster case 50 are such that the case front plate 51 does not fall apart.

The tray support 70 may be secured to one or more trays 74, on which each food item may be placed. In one aspect of the present invention, the number of the trays 74 is equal to the number of toaster entrances 62. In another aspect of the present invention, a predetermined portion of each tray 74 may project from a corresponding toaster entrance 62 when the toaster door 40 is completely opened.

A first end of the connecting lever 76 may be rotatably coupled to the bushing 72 and may be connected to a first end of a spring 79. A second end of the connecting lever 76 may be rotatably coupled to a bottom portion of the toaster door 40. A second end of the spring 79 may be connected to the spring hook 53' provided at the rear case plate 53. In use, the spring 79 may exert a force on the first end of the connecting lever 76 toward the spring hook 53', thereby biasing the toaster door 40 towards a closed position.

The operation of the microwave oven incorporating a toaster according to the present invention will now be described in detail. Referring to FIG. 2, for the sake of explanation only, it will be assumed that the toaster door 40 is closed and is thus arranged at the front of the toaster panel 32 and the surfaces of the toaster panel 32 and the toaster door 40 are flush.

If a user pulls down the toaster door handle 43 so as to open the toaster door 40, the toaster door 40 rotates about an axis formed by the hinge pins 42 and hinge holes 34. At the same time, the connecting lever 76 moves the bushing 72 along and within the moving slots 54 such that the busing 72 moves the tray support 70 in a direction toward the front end of the tray 74. Due to the movement of the tray support 70 and the fact that the tray 74 is securely arranged to the tray support 70, a predetermined portion of the tray 74 projects from the toaster entrance 62. In one aspect of the present invention, the predetermined portion of the tray 74 projects from the toaster entrance 62 when the toaster door is completely opened. Next, a food item may be placed on the tray 74 by a user.

If the toaster door 40 is closed (e.g., after a food item is placed on the tray 74), the tray support 70 is returned to its original position by a restoring force provided by the spring 79. Next, if power is supplied, the toaster 30 starts to toast the food item by generating heat from the heating element wires of the heating plate 80. Since each food item is placed on the tray 74 securely arranged on the tray support 70, the entire food item may be heated uniformly.

The rear flange 75 provided at the rear of the tray 74 supports the back of the food item that it is stably positioned on the tray 74 when the toaster door 40 is opened after the toaster stops heating. In one aspect of the present invention, the rear flange 75 may be pulled to push a food item out from inside the toaster case if the food item were to get stuck at the case entrance 52 of the case from plate 51. For example, food item B may get stuck at the case entrance 52 if, for example, it were to lean slightly on the tray 74.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A tray assembly for a microwave oven incorporating a toaster, comprising:

a microwave cavity;

a toaster arranged adjacent to the microwave cavity;

a tray support provided inside the toaster;

at least one tray provided on top of the tray support for holding a food item, the tray comprising at least one elevating bracket for maintaining a predetermined distance between the tray and the tray support; and a support wall provided at a front end of the tray for supporting a front lower portion of the food item so as to stably position the food item at an optimal location for toasting.

2. The tray assembly of claim 1, wherein the elevating bracket comprises at least one fastening hook extending downward and along a first direction parallel to the tray.

3. The tray assembly of claim 2, wherein the tray support comprises a first plurality of fastening slits for accommodating the at least one fastening hook.

4. The tray assembly of claim 3, wherein the elevating bracket further comprises at least one extension extending downward.

5. The tray assembly of claim 4, wherein the tray support further comprises a second plurality of fastening slits for accommodating the at least one extension.

6. The tray assembly of claim 5, wherein the at least one extension comprises a detent, which engages with an aperture provided on the tray support for slip fit engagement.

7. The tray assembly of claim 1, wherein the tray further comprises a rear flange provided at a rear end of the tray for supporting a backside of the food item.

8. The tray assembly of claim 1, wherein the tray further comprises one or more ventilation slits for heat circulation.

9. The tray assembly of claim 1, wherein the tray support comprises a plurality of air-openings provided within a flat area of the tray support for heat circulation.

10. The tray assembly of claim 1, further comprising a case for supporting the tray support inside of the toaster.

11. The tray assembly of claim 10, further comprising:

a bushing; and a moving slot arranged within the case, wherein the moving slot is oriented parallel to the tray, wherein the bushing moves within the moving slot, and wherein the tray support is supported by the bushing.

12. The tray assembly of claim 11, further comprising:

a connecting link having a first end and a second end, the bushing being rotatably coupled to the first end;

a toaster panel provided on a front side of the toaster;

at least one toaster entrance;

a toaster door rotatably coupled to the second end, the toaster door being provided on the toaster panel for opening and closing the at least one toaster entrance.

13. The tray assembly of claim 12, wherein the tray further comprises a rear flange that blocks the at least one toaster entrance when the toaster door is fully opened.

14. A tray assembly for a microwave oven incorporating a toaster, comprising:

a microwave cavity;

a toaster provided adjacent to the microwave cavity;

a tray support provided inside the toaster; and at least one tray fastened on top of the tray support for holding a food item, the tray comprising at least one elevating bracket for maintaining a predetermined distance between the tray and the tray support, wherein the elevating bracket comprises at least one extension extended downward, and wherein the tray support comprises a first plurality of fastening slits for accommodating the at least one extension.

15. The tray assembly of claim 14, wherein the at least one extension comprises a detent, which engages with an aperture provided on the tray support for slip fit engagement.

16. The tray assembly of claim 15, wherein the elevating bracket further comprises at least one fastening hook extending downward and along a first direction parallel to the tray, and wherein the tray support further comprises a second fastening slits for accommodating the at least one fastening hook.

17. The tray assembly of claim 14, wherein the tray further comprises a rear flange provided at a rear end of the tray for supporting a backside of the food item.

18. The tray assembly of claim 14, wherein the tray further comprises one or more ventilation slits for heat circulation.

19. The tray assembly of claim 14, wherein the tray support comprises a plurality of air-openings provided within a flat area of the tray support for heat circulation.

20. The tray assembly of claim 14, further comprising a case for supporting the tray support inside of the toaster.

21. The tray assembly of claim 20, further comprising:

a bushing; and a moving slot arranged within the case, wherein the moving slot is oriented parallel to the tray, wherein the bushing moves within the moving slot, and wherein the tray support is supported by the bushing.

22. The tray assembly of claim 21, further comprising:

a connecting link having a first end and a second end, the bushing being rotatably coupled to the first end;

a toaster panel provided on a front side of the toaster;

at least one toaster entrance;

a toaster door rotatably coupled to the second end, the toaster door being provided on the toaster panel for opening and closing the at least one toaster entrance.

23. The tray assembly of claim 22, wherein the tray further comprises a rear flange that blocks the at least one toaster entrance when the toaster door is fully opened.

24. The tray assembly of claim 14, further comprising a support wall provided at a front end of the tray for supporting a front lower portion of the food item so as to stably position the food item at an optional location for toasting.

* * * * *